(12) United States Patent
Beatty et al.

(10) Patent No.: US 8,567,599 B2
(45) Date of Patent: Oct. 29, 2013

(54) MULTIFUNCTIONAL ELECTRONIC DEVICE CASE

(75) Inventors: Joshua Beatty, Louisville, KY (US); Michael Casto, Louisville, KY (US)

(73) Assignee: modulR LLC, Louisville, KY (US)

( * ) Notice: Subject to any disclaimer, the term of this patent is extended or adjusted under 35 U.S.C. 154(b) by 190 days.

(21) Appl. No.: 13/014,351

(22) Filed: Jan. 26, 2011

(65) Prior Publication Data

US 2012/0024741 A1 Feb. 2, 2012

Related U.S. Application Data

(60) Provisional application No. 61/298,540, filed on Jan. 26, 2010, provisional application No. 61/305,167, filed on Feb. 17, 2010, provisional application No. 61/323,379, filed on Apr. 13, 2010, provisional application No. 61/311,308, filed on Mar. 6, 2010.

(51) Int. Cl.
*B65D 85/30* (2006.01)

(52) U.S. Cl.
USPC ............ 206/320; 224/218; 224/666; 224/930

(58) Field of Classification Search
USPC .......... 206/305, 320, 701; 224/191, 197, 271, 224/272, 665, 930, 250, 666; D3/218; D14/250; 361/679.3, 679.4, 679.41, 361/679.55, 679.56, 679.03; 455/575.1, 455/575.4, 575.8
See application file for complete search history.

(56) References Cited

U.S. PATENT DOCUMENTS

| | | | | |
|---|---|---|---|---|
| 4,419,794 A | * | 12/1983 | Horton et al. ................ | 224/197 |
| 5,205,447 A | * | 4/1993 | Hambrick .................. | 224/42.33 |
| 5,620,120 A | * | 4/1997 | Tien .............................. | 224/199 |
| 5,833,100 A | * | 11/1998 | Kim ............................. | 224/197 |
| 5,850,954 A | * | 12/1998 | Dong-Joo .................... | 224/197 |
| 6,029,871 A | * | 2/2000 | Park ............................. | 224/197 |
| 6,964,361 B2 | * | 11/2005 | Kathrein ...................... | 224/183 |
| D540,539 S | | 4/2007 | Gutierrez | |
| 7,343,184 B2 | | 3/2008 | Rostami | |
| 8,029,443 B2 | * | 10/2011 | Goodnow ..................... | 600/365 |
| 2003/0103624 A1 | | 6/2003 | Hu | |
| 2005/0153749 A1 | | 7/2005 | Falcon et al. | |
| 2006/0274493 A1 | | 12/2006 | Richardson et al. | |
| 2007/0163904 A1 | | 7/2007 | Martin et al. | |
| 2007/0215659 A1 | | 9/2007 | Knapp et al. | |
| 2007/0234620 A1 | * | 10/2007 | Vineyard ........................ | 40/762 |
| 2007/0261978 A1 | | 11/2007 | Sanderson | |
| 2008/0053802 A1 | | 3/2008 | Rae et al. | |
| 2009/0084705 A1 | * | 4/2009 | Justiss ........................... | 206/724 |
| 2009/0219677 A1 | * | 9/2009 | Mori et al. ............... | 361/679.03 |
| 2010/0203931 A1 | * | 8/2010 | Hynecek et al. .......... | 455/575.8 |

OTHER PUBLICATIONS

Notification of Transmittal of the International Search Report and the Written Opinion of the International Searching Authority, or the Declaration of corresponding application PCT/US2011/022560 mailed Jun. 9, 2011, 13 pages.

* cited by examiner

*Primary Examiner* — Luan K Bui
(74) *Attorney, Agent, or Firm* — Fredrikson & Byron, P.A.

(57) ABSTRACT

A case for an electronic device includes a main body configured to secure and protect the electronic device and one or more accessory-attachment nodes configured to be coupled to a case accessory. Example case accessories include shoulder straps, car headrest frames, wall-mounting frames, and the like. When the electronic device case is mated to the case accessory using the one or more accessory-attachment nodes, the electronic device may be securely positioned for transport and/or use. Further, the one or more accessory-attachment nodes may allow the case and, in particular, the electronic device coupled to the case, to be easily moved from one case accessory to another case accessory.

28 Claims, 11 Drawing Sheets

MULTIFUNCTIONAL ELECTRONIC DEVICE CASE

This application claims the benefit of U.S. Provisional Application Nos. 61/298,540, filed Jan. 26, 2010, 61/305,167, filed Feb. 17, 2010, 61/323,379, filed Apr. 13, 2010, and 61/311,308, filed Mar. 6, 2010. The entire contents of these applications are hereby incorporated by reference.

TECHNICAL FIELD

This disclosure relates to electrical devices and, more particularly, to cases for electrical devices.

BACKGROUND

Portable electrical devices, such as portable electrical computing devices, have become indispensable tools in personal and professional settings. Examples of such portable electrical computing devices include multipurpose cellular phones (so called "smart" phones), laptop computers, electronic book readers, tablet computers, and other similar portable devices. These devices typically include a display screen, a portable power source, different user input features, and various computing hardware and software. In some cases, these devices also include wireless transmission capabilities for sending and receiving data.

One of the fastest growing segments of portable electrical computing devices is the tablet computer market. The iPad® brand tablet computer manufactured by Apple Computer, Inc., for example, has been widely popular with consumers since being introduced in early 2010. While the specific features of a tablet computer may vary, in many examples the tablet computers provide a range of functionalities such as checking e-mail, reading the news, surfing the internet, watching movies and videos, displaying photos and graphics, writing, playing games, and the like.

Because of their portability, tablet computers are often used in a variety of different settings and configurations, which may be constantly change. For example, a tablet computer may be used at one time to watch a movie in a car, at another time to watch a video in a house, and at yet another time as a stationary display for displaying a photo. In still other situations, the tablet computer may be held in a user's hand to, for example, read, write, or play games. Configuring the tablet computer so that the computer can be readily transported and/or used in all of these different environments may increase the utility and versatility of the tablet computer.

SUMMARY

This disclosure is directed toward cases for securing and protecting electronic devices. In some examples, the cases include one or more accessory-attachment nodes that are configured to be coupled to a case accessory such as, e.g., a shoulder strap, a car headrest frame, a wall-mounting frame, and the like. When the electronic device case is mated to the case accessory using the one or more accessory-attachment nodes, the electronic device may be securely positioned for transport and/or use. Further, the one or more accessory-attachment nodes may allow the case and, in particular, the electronic device coupled to the case, to be easily and quickly moved from one case accessory to another case accessory.

In accordance with one example described herein, a case for an electronic device is described that includes a main body and one or more accessory-attachment nodes. The main body is configured to secure and protect the electronic device. The main body includes a primary section having a front surface and a rear surface, the front surface of the primary section being configured to contact a back surface of the electronic device. The main body also includes first and second side sections each extending frontwardly from the primary section, the first and second side sections being configured to apply force to a first pair of opposed sides of the electronic device. The main body further includes first and second latch sections extending toward one another, the first latch section extending from the first side section, and the second latch section extending from the second side section, the first and second latch sections being configured to apply force to a front of the electronic device. According to the example, the one or more accessory-attachment nodes on the rear surface of the primary section, the one or more accessory-attachment nodes being configured to be coupled to a case accessory.

In another example, a system for protecting an electronic device and using the electronic device in various settings is described. The system includes a first case accessory and a case for the electronic device. The case includes a main body and one or more accessory-attachment nodes. The main body is configured to secure and protect the electronic device. The main body includes a primary section having a front surface and a rear surface, the front surface of the primary section being configured to contact a back surface of the electronic device. The main body also includes first and second side sections each extending frontwardly from the primary section, the first and second side sections being configured to apply force to a first pair of opposed sides of the electronic device. The main body further includes first and second latch sections extending toward one another, the first latch section extending from the first side section, and the second latch section extending from the second side section, the first and second latch sections being configured to apply force to a front of the electronic device. According to the example, the one or more accessory-attachment nodes on the rear surface of the primary section, the one or more accessory-attachment nodes being configured to be coupled to a case accessory.

In another example, a method of protecting an electronic device and using the electronic device in various settings is described. The method includes providing a case that includes a main body having a primary section with a front surface and a rear surface, first and second side sections each extending frontwardly from the primary section, and first and second latch sections extending toward one another, the first latch section extending from the first side section, and the second latch section extending from the second side section, and that includes one or more accessory-attachment nodes on the rear surface of the main body's primary section. The method also includes putting the electronic device into the case, including positioning a back surface of the electronic device in contact with the front surface of the main body's primary section, positioning a first pair of opposed sides of the electronic device in contact with the main body's first and second side sections such that the main body's first and second side sections apply force to the first pair of opposed sides of the electronic device, and positioning a front of the electronic device in contact with the main body's first and second latch sections such that the main body's first and second latch sections apply force to the front of the electronic device. The method also includes providing a first case accessory, and coupling the case to the first case accessory, including coupling at least one of the one or more accessory-attachment nodes to the first case accessory.

The details of one or more examples are set forth in the accompanying drawings and the description below. Other features, objects, and advantages will be apparent from the description and drawings, and from the claims.

BRIEF DESCRIPTION OF DRAWINGS

The following drawings are illustrative of particular examples of the present disclosure and therefore do not limit the scope of the disclosure. The drawings are not to scale (unless so stated) and are intended for use in conjunction with the explanations in the following detailed description. Examples will hereinafter be described in conjunction with the appended drawings, wherein like numerals denote like elements.

DETAILED DESCRIPTION

Figure 1:
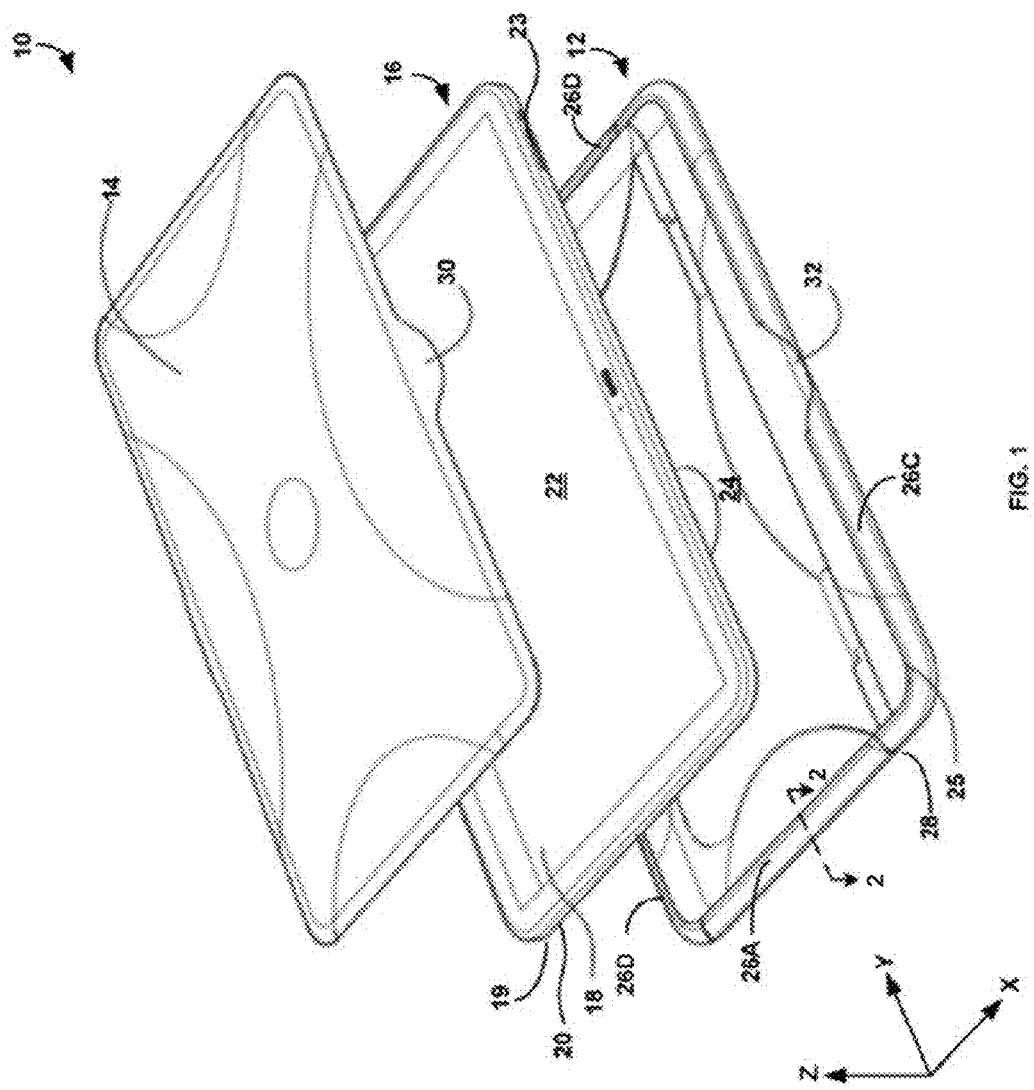
FIG. 1 is a perspective view of an example electronic device case and an example electronic device in accordance with examples of the present disclosure.

The following detailed description is exemplary in nature and is not intended to limit the scope, applicability, or configuration of the invention in any way. Rather, the following description provides practical illustrations for implementing exemplary embodiments of the present invention. Examples of constructions, materials, dimensions, and manufacturing processes are provided for selected elements, and all other elements employ that which is known to those of skill in the field of the invention. Those skilled in the art will recognize that many of the examples provided have suitable alternatives that can be utilized.

An electronic device may provide portable, interactive computing power that can be used in a variety of different settings for a variety of different tasks. For example, an electronic device such as a tablet computer can be used in a professional setting for one type of task (e.g., reading and writing), in a residential setting for another type of task (e.g., displaying a photo), and while traveling for yet another type of task (e.g., watching a video). Because of this versatility, the portable electronic device is often transported from place to place. However, during transport, the portable electronic device may be subject to physical abuses associated with portability (e.g., dropping and scratches). Further, even once the portable electronic device has arrived from transport, it may be difficult to find a safe, secure location for positioning the portable electronic device for subsequent use.

This disclosure describes a case for an electronic device. The case may protect the electronic device from unwanted elements such as, e.g., debris, scratching, and abrasions. The case may also secure the electronic device to the case. For example, in one instance, the case includes a first side section and a second side section that extend upwardly from a primary section to apply a force to the sides of the electronic device. In another example, the case includes a first latch section and a second latch section that extend from the first and second side sections, respectively, to apply a force to the front of the electronic device. Upon inserting the electronic device into the case, the case can secure the electronic device. Should the electronic device thereafter be subject to physical abuses, the case may protect the electronic device from physical damage.

In an additional example, the case includes an accessory-attachment node that can be coupled to a case accessory. For instance, in one example the accessory-attachment node include male coupling hardware that is configured to mate with female coupling hardware of the case accessory. In another example, the accessory-attachment node includes female coupling hardware that is configured to mate with male coupling hardware of the case accessory. Example case accessories include shoulder straps, car headrest frames, wall-mounting frames and the like. When the electronic device case is mated to the case accessory using the accessory-attachment node, the electronic device may be securely positioned for use. Such a configuration may protect the electronic device from inadvertent physical damage and/or position the electronic device for comfortable use by a user.

Different views of example case features and case accessories will be described in greater detail with reference to FIGS. 2-9. However, an example electronic device case and an example electronic device will first be described with reference to FIG. 1.

FIG. 1 is a conceptual view of an example electronic device case 10 (hereinafter "case 10") in accordance with this disclosure. Case 10 includes main body 12 and cover 14. Main body 12 is configured to secure and protect electronic device 16. Electronic device 16 can be positioned onto main body 12, and cover 14 can be positioned over main body 12 to substantially encase electronic device 16 within case 10. Case 10 may help protect electronic device 16 during use and/or transport from physical damage such as, e.g., scratches and abrasions. Further, as described in greater detail below, case 10 may include one or more features that allow case 10 to be coupled to a case accessory. For instance, in one example, case 10 includes one or more accessory-attachment nodes (FIGS. 3 and 4A) that are configured to be mated with corresponding coupling hardware on a case accessory. In another example, case 10 is part of a system that includes a plurality of case accessories, where each case accessory includes coupling hardware that is configured to mate with the one or more coupling features of case 10. Such a system may allow case 10, and in particular electronic device 16 connected to case 10, to be easily and quickly attached and detached from each of the different case accessories, e.g., as case 10 is transported from one location to another location, or as a user switches from using electronic device 16 for one task to using electronic device 16 for another task. Case 10 may include additional or different features, as described below.

Case 10 is configured to secure and protect electronic device 16. In general, electronic device 16 may be any portable device that is configured to operate on electrical power (i.e., either through a portable power source, such as a battery, or through an electrical connection to a power source). In the example of FIG. 1, electronic device 16 is generally illustrate in the style of a tablet computer. A tablet computer may be a tablet- or slate-shaped mobile computing device that provides functionalities such as, e.g., checking e-mail, reading the news, surfing the internet, watching movies and videos, displaying photos and graphs, writing, playing games, and the like. In one example, electronic device 16 is an iPad® brand tablet computer distributed by Apple Computer, Inc. In other examples, electronic device 16 may be a Blackberry® Playbook™, Samsung® Galaxy Tab, Android® Tablet, or any other type of tablet computer or portable electrical device, as will be appreciated by those of skill in the art.

Because electronic device 16 is generally illustrated in the style of a tablet computer in FIG. 1, the remainder of the present disclosure generally refers to an example configuration of case 10 that is designed to receive a tablet computer. However, other configurations of case 10 are possible in accordance with the present disclosure and it should be appreciated that the disclosure is not limited to any particular type of electrical device. For example, electronic device 16 may be a portable video game device, a smart phone, an electronic book reader, or a laptop computer.

In the example of FIG. 1, which generally depicts a tablet computer-style electronic device, electronic device 16 includes a front surface 18, a back surface 19, and at least one sidewall 20 connecting the front surface to the back surface, which in the example of FIG. 1 is illustrated as two pairs of opposing sidewalls. Front surface 18 includes a display screen 22 and a media port 23. Display screen 22 is capable of displaying visual media such as text and graphics (e.g., photo and video graphics). In some examples, electronic device 16 is configured to change the orientation of visual media displayed on display screen 22 depending on the orientation of electronic device 16 (e.g., varying the orientation of the displayed visual media between portrait and landscape views depending on the orientation of electronic device 16). In some additional examples, display screen 22 is configured to receive user input and, as such, may be referred to as a touch screen or a stylus-operated screen.

To help secure and protect electronic device 16, electronic device 16 may be put into case 10. Case 10 can assume different configurations; however, in the example of FIG. 1, case 10 includes main body 12 and cover 14. Main body 12 includes a primary section 24 and at least one side section extending upwardly (i.e., in the Z-direction indicated on FIG. 1) from primary section 24, which in the example of FIG. 1 are illustrated as four side sections 26A-26D (collectively "side sections 26"). Cover 14 is configured to mate with main body 12 to substantially enclose electronic device 16 within a cavity defined between main body 12 and cover 14. Specifically, in the example of FIG. 1, cover 14 is configured to be press-fitted down (i.e., in the Z-direction) on to main body 12 such that cover 14 mates with side sections 26 to encase electronic device 16. Although in other examples, case 10 may not include cover 14, or cover 14 may define a different configuration. In FIG. 1, electronic device 16 can be positioned on main body 12, and cover 14 can be positioned over electronic device 16 to help protect electronic device 16 within a bounded cavity defined by primary section 24, side sections 26, and cover 14. By positioning electronic device 16 between main body 12 and cover 14, case 10 may provide protection to substantially the entire body of electronic device 16, e.g., to prevent damage from dropping, scratches, or other physical abuse. Further, as will be described in greater detail below with respect to FIGS. 3 and 4A-4B, case 10 may include one or more features that may be used to mate case 10 and, in particular, electronic device 16 within case 10, to a case accessory.

In the example of FIG. 1, main body 12 includes primary section 24 that defines a front surface 25 and a rear surface 28 opposite front surface 25. Front surface 25 of primary section 24 is configured to contact back surface 19 of electronic device 16 when electronic device 16 positioned in case 10. Rear surface 28 of primary section 24 may, as described in greater detail below, include one or more features for coupling case 10 to a case accessory.

Primary section 24 of main body 12 may define any suitable size and shape, and the size and shape of primary section 24 may vary, e.g., based on the size and shape of electronic device 16. For example, primary section 24 may define a planar surface that is configured (e.g., sized and shaped) to mate with a planar back surface 19 of electronic device 16, or primary section 24 may define a non-planar surface. Further, primary section 24 may define a substantially continuous structure that encases substantially the entire back surface 19 of electronic device 16 when electronic device 16 is positioned against primary section 24, or primary section 24 may define a discontinuous structure that encases less than substantially the entire back surface 19 of electronic device 16. A discontinuous structure for primary section 24 may be useful for a variety of reasons such as, e.g., to reduce the amount of material required for case 10, to provide cooling holes that allow heat to conductively transfer away from electronic device 16 during operation, to allow a logo or camera lens or user interface feature of electronic device 16 to be visible and/or accessible through case 10, or the like.

Upon positioning back surface 19 of electronic device 16 in contact with front surface 25 of primary section 24 of main body 12, it may be useful to physically connect electronic device 16 to main body 12, e.g., to form an integral assembly that resists detachment except with user assistance. Physically attaching electronic device 16 to case 10 may prevent electronic device 16 from inadvertently coming out of case 10 during use or transport. For this reason, case 10 can include any features suitable for mechanically attaching electronic device 16 to primary section 24. In one example, case 10 includes a mechanical fixation element such as, e.g., a bolt, screw, pressure sensitive adhesive, or the like to mechanically attach electronic device 16 to main body 12. In another example, as illustrated in the example of FIG. 1, case 10 is configured to frictionally engage with electronic device 16 to prevent electronic device 16 from moving out of alignment with main body 12 after electronic device 16 is positioned within case 10.

In examples where case 10 is configured to frictionally engage with electronic device 16, a variety of different frictional engagement features can be used to create a friction fit between electronic device 16 and case 10. For instance, in one example, main body 12 of case 10 includes at least two opposing side sections, such as side sections 26A and 26B or side sections 26C and 26D in FIG. 1, that are configured to create friction fit between electronic device 16 and case 10. When electronic device 16 is positioned in contact with primary section 24 of main body 12, the opposing side sections 26 of main body 12 may apply a force to corresponding opposed side of electronic device 16. This force may resist separation between case 10 and electronic device 16. For example, depending on the configuration and construction of case 10, side sections 26A and 26B and/or side sections 26C and 26D of main body 12 may be configured to deflect away from a center of primary section 24 (e.g., with the application of hand pressure). In such an example, electronic device 16 can be positioned in contact with primary section 24, and side sections 26A and 26B and/or side sections 26C and 26D can thereafter return to their undeflected positions, resulting in a compressive force on opposing sides of electronic device 16. In some examples, case 10 includes more than two opposing side sections, such as four side sections 26A-26D in the example configuration of case 10 in FIG. 1, to apply force to at least two different pairs of opposed side of electronic device 16. Additional side sections may increase the force, and hence resistance to separation, between case 10 and electronic device 16.

In some examples, one or more side sections 26 of case 10 may include a latch section that is configured to apply a force to electronic device 16 in addition to the force applied to the electronic device by the one or more side section 26 of case 10. The latch section may apply a compressive force to electronic device 16 from a different direction than the direction in which force is applied by the side section.

Figure 2:
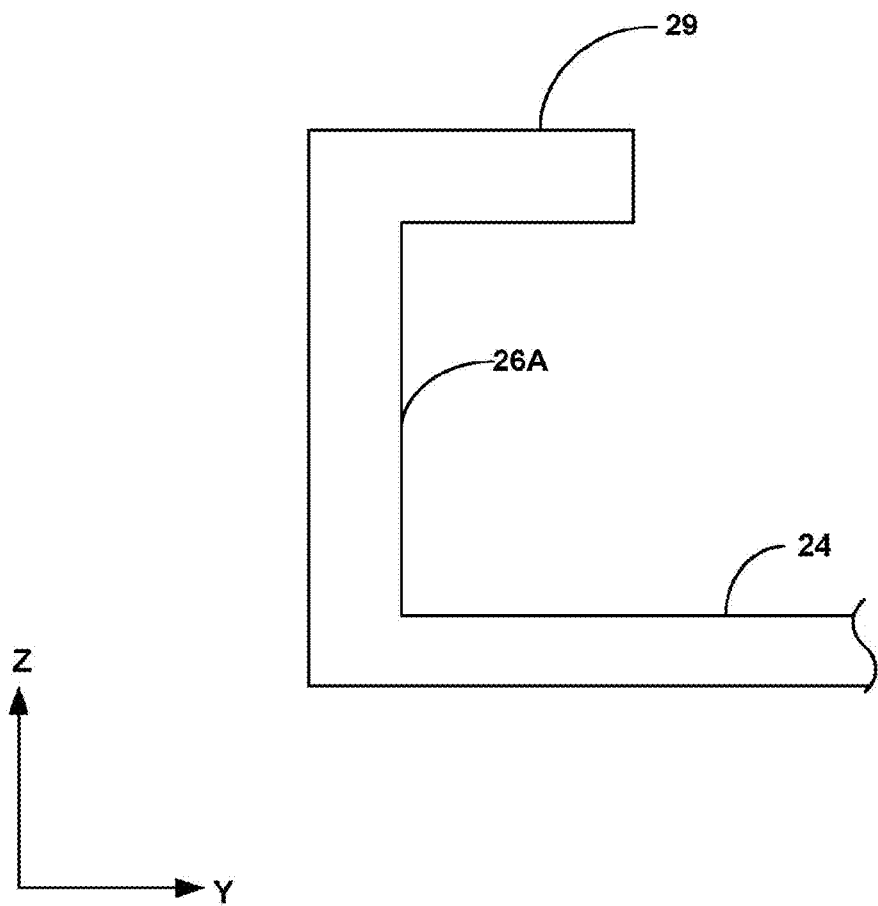
FIG. 2 is a conceptual cross-section view of an example side surface of the electronic device case of FIG. 1, taken along the 2-2 cross-sectional line indicated on FIG. 1.

FIG. 2 is a cross-sectional view of side section 26A taken along the 2-2 cross-sectional line illustrated in FIG. 1. FIG. 2 illustrates one example configuration for a latch section, although other configurations are contemplated. As seen in the example of FIG. 2, a latch section 29 extends in a substantially perpendicular direction from side section 26A. The space defined between side section 26A and latch section 29 is configured (e.g., sized and shaped) to receive an edge of electronic device 16. When electronic device 16 is inserted onto main body 12 (FIG. 1), side section 26A and latch section 29 can enclose over a side section of electronic device 16 such that side section 26A of applies a force to a side of electronic device 16 (i.e., in the Y-direction indicated on FIG. 1) and latch section 29 applies a force to front surface 18 of electronic device 16 (i.e., in the negative Z-direction indicated on FIG. 2). In this manner, electronic device 16 can be frictionally engaged with case 10 from at least two different directions, which may increase the amount of force required to separate electronic device 16 from case 10 as opposed to when electronic device is only frictionally engaged with case 10 from one direction.

Depending on the configuration of case 10, more than one side section of main body 12 may include a latch section. In one example, a latch section extends from side section 26A (e.g., in the positive Y-direction) toward another latch section that extends from side section 26B (e.g., in the negative Y-direction). In another example, a latch section extends from side section 26C (e.g., in the negative X-direction indicated on FIG. 1) toward another latch section that extends from side section 26D (e.g., in the positive X-direction indicated on FIG. 1). In still another example, side sections 26A-26D may each include latch sections. Independent of the specific number or arrangement of latch sections, each latch section of case 10 may be continuous or discontinuous along a length of a side section. That is, each latch section of case 10 may follow substantially an entire length of a side section, or a latch section may follow less than an entire length of a side section. In the example of FIG. 1, each latch section of side sections 26 defines a substantially continuous edge that is configured to apply a force on around a front peripheral surface of electronic device 16. In general, a longer latch section may provide more friction force to resist separation between electronic device 16 and case 10 than a comparatively shorter latch section.

As briefly discussed above, main body 12 of case 10 includes at least one side section, which is illustrated as four interconnected side sections 26 that surround a substantially rectangular-shaped primary section 24. Side sections 26 extend upwardly (i.e., in the Z-direction indicated on FIG. 1) from primary section 24. Side sections 26 may help protect the sides of electronic device 16 from physical damage and may also provide a frictional force that resists separation between electronic device 16 and case 10. In some examples, as illustrated in FIG. 1, side sections 26 extend around substantially the entire perimeter of primary section 24 (i.e., in the X-Y plane indicated on FIG. 1). In such an example, side sections 26 define a substantially continuous edge section that is configured to apply a force to the side of electronic device 16. In other examples, side sections 26 extend around less than the entire perimeter of primary section 24. For example, main body 12 may include a plurality of discrete side sections segments that are physically separated from one another around primary section 24. In yet other examples, main body 12 may not include side sections 26. In such an example, electronic device 16 may be positioned on primary section 24 and attached using a mechanical fixation element, and the sides of electronic device 16 may be unshielded.

While main body 12 is illustrated as defining a substantially rectangular shape, in other examples main body 12 can define other shapes. Main body 12 can define any polygonal (e.g., square, hexagonal) or arcuate (e.g., circular, elliptical) shape, or even combinations of polygonal and arcuate shapes. The specific shape of main body 12 may vary, e.g., based on the specific shape of electronic device 16. Further, as described in greater detail below with respect to FIG. 3, main body 12 of case 10 may support one or more accessory-attachment features for attaching case 10 to a case accessory. In such examples, main body 12 may define a shape that is dictated by a desired location of the one or more accessory-attachment features. For instance, in one example, main body 12 defines an X-shape where four accessory-attachment features are positioned on opposing prongs of the "X." Other shapes and configurations of main body 12 are contemplated, however, and it should be appreciated that the disclosure is not limited in this respect.

Electronic device 16 may be subject to unwanted physical contact, such as scratches or abrasive forces, on display screen 22 during transport and/or use. For this reason, case 10 may include a cover that mates with main body 12 to help protect electronic device 16 when the electronic device is positioned in main body 12. Case 10 can include any suitable cover including, e.g., a cover that mates with main body 12 such that there is substantially no separation gap between the cover and main body 12.

In the example of FIG. 1, cover 14 is defined as a substantially planar sheet that is configured to be fitted over front surface 18 of electronic device 16. Cover 14 is illustrated as being entirely removable from main body 12, although in other examples, cover 14 may be connected to main body 12, e.g., via a hinged connection. Cover 14 can be mechanically affixed to front surface 18 of electronic device 16 and/or main body 12 using any suitable mechanical fixation element. In the example of FIG. 1, cover 14 includes cover tab 30 that extends outwardly and downwardly (i.e., in the X- and Z-directions indicated on FIG. 1). Cover tab 30 is adapted to mate with a corresponding main body slot 32 so as to frictionally connect cover 14 to main body 12. In some examples, cover 14 includes an additional cover tab on an opposing side over cover 14 (e.g., an opposing side from cover tab 30) that is adapted to mate with a corresponding body slot. Such an arrangement may frictionally secure cover 14 to main body 12 on at least two opposing sides. In some embodiments, main body 12 can include the tab(s), and cover 14 can include the slot(s). Many configurations are possible and contemplated.

In examples where case 10 includes cover 14, cover 14 can be constructed from any suitable materials. For instance, in one example, cover 14 is constructed of ABS (acrylonitrile butadiene styrene) polycarbonate. In such an example, cover 14 may define a substantially rigid protection surface that protects display screen 22 of electronic device 16 during transport and storage. When cover 14 defines a substantially rigid protection surface, the cover may be removed from display screen 22 prior to using electronic device 16. In another example, cover 14 is constructive flexible polymeric material that overlays display screen 22 as a screen protector. In such an example, electronic device 16 may be used without first removing cover 14. Other materials and configurations for cover 14 are both possible and contemplated.

The specific dimensions of case 10 may vary, e.g., based on the specific dimensions of electronic device 16. That being said, in some examples, case 10 may be approximately 24 centimeters long (i.e., in the Y-direction indicated on FIG. 1), approximately 19 centimeters wide (i.e., in the X-direction), and approximately 1.5 centimeters tall (i.e., in the Z-direction). These dimensions are merely examples, however, and other dimensions are possible.

As briefly described above, electronic device 16 may be a portable, versatile electronic device that can be used in a variety of different environments. For instance, in the specific example of a tablet computer, the tablet computer may be used for such diverse tasks as word processing, browsing the internet, watching a movie, displaying photos (i.e., as an electronic picture frame), and the like. Because of this versatility, a single tablet computer may be used in a variety of different locations for a variety of different tasks. Ensuring that the tablet computer (or other electronic device) is properly secured and/or positioned during transport and/or use in these various situations may enhance the utility and functionality of the electronic device.

In some situations, an accessory to electronic device 16 (e.g., a component that is external or separate from electronic device 16) may be used to secure and/or position electronic device 16 during transport and/or use. For example, one accessory to electronic device 16 may be used to help transport electronic device 16 and another accessory may be used to orient and/or securely position electronic device 16 once at a desired location.

In accordance with examples of this disclosure, an electronic device case may include one or more features that allow the case to be coupled to a case accessory. For example, case 10 described above with respect to FIGS. 1 and 2 may include one or more accessory-attachment nodes that provide attachment points for mounting and/or fastening case accessories to the case. In instances in which case 10 is included in a system of case accessories that include corresponding coupling hardware, the one or more accessory-attachment nodes may function as interchangeable attachment points that allow case 10, and in particular electronic device 16 coupled to case 10, to be easily coupled and decoupled to different case accessories.

Figure 3:
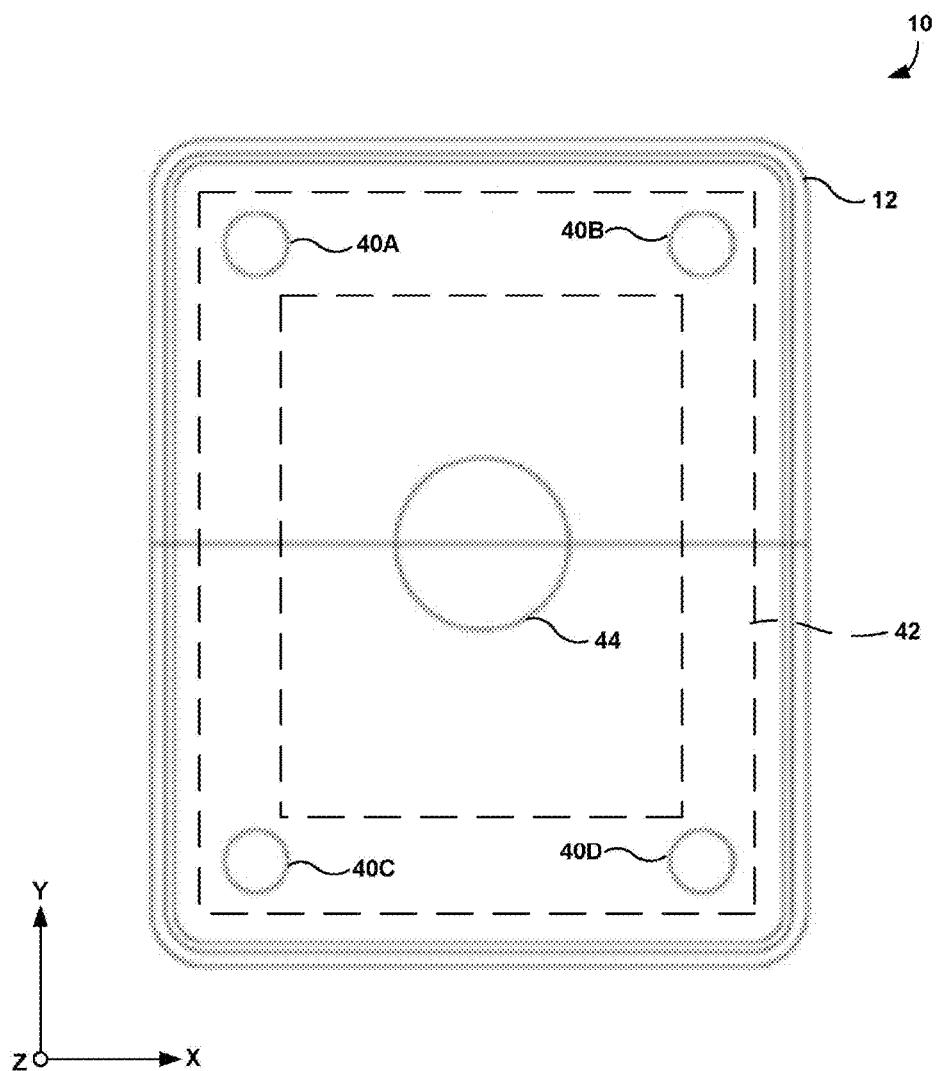
FIG. 3 is a perspective view of an example rear surface of the electronic device case of FIG. 1 illustrating one or more example accessory-attachment nodes and an example case accessory.

FIG. 3 is conceptual illustration of one example of case 10 that include includes one or more accessory-attachment nodes. Specifically, FIG. 3 is a conceptual illustration of an example rear surface 28 of case 10 that includes four accessory-attachment nodes 40A-40D (collectively "nodes 40"). Accessory-attachment nodes 40 define connections that can be used to couple case 10 to case accessory 42. In the example of FIG. 3, rear surface 28 also includes logo cutout 44, which defines an opening in case 10 through which a logo on electronic device 16 may be visible.

Each accessory-attachment node of accessory-attachment nodes 40 is configured to couple to corresponding hardware of case accessory 42. When case 10 is coupled to case accessory 42 via one or more of accessory-attachment nodes 40, case 10 may resist separation from case accessory 42 except with user assistance. In some examples, a user may use accessory-attachment nodes 40 to create a physical connection between case 10 and one of a plurality of case accessories.

Each accessory-attachment node of accessory-attachment nodes 40 can include any suitable feature for mechanically affixing case 10 to case accessory 42. In one example, each accessory-attachment node of accessory-attachment nodes 40 includes a magnetic element that is configured to magnetically couple to case accessory 42. In another examples, each accessory-attachment node of accessory-attachment nodes 40 includes male coupling hardware (e.g., a protruding connector extending from rear surface 28) that is configured to mate with corresponding female coupling hardware of case accessory 42 (e.g., a port defined on case accessory 42). In still another example, each accessory-attachment node of accessory-attachment nodes 40 includes female coupling hardware that is configured to mate with corresponding male coupling hardware on case accessory 42. In some such examples, the male coupling hardware can include a T-hook, and the female coupling hardware can include a corresponding slot. In some such examples, the connection between the two sets of hardware can be a dovetail-type configuration. In yet further examples, case 10 includes a combination coupling hardware (e.g., magnetic and/or male and/or female coupling hardware), enabling case 10 to mate with different types of case accessories. Other types of accessory-attachment nodes are possible.

Figure 4A:
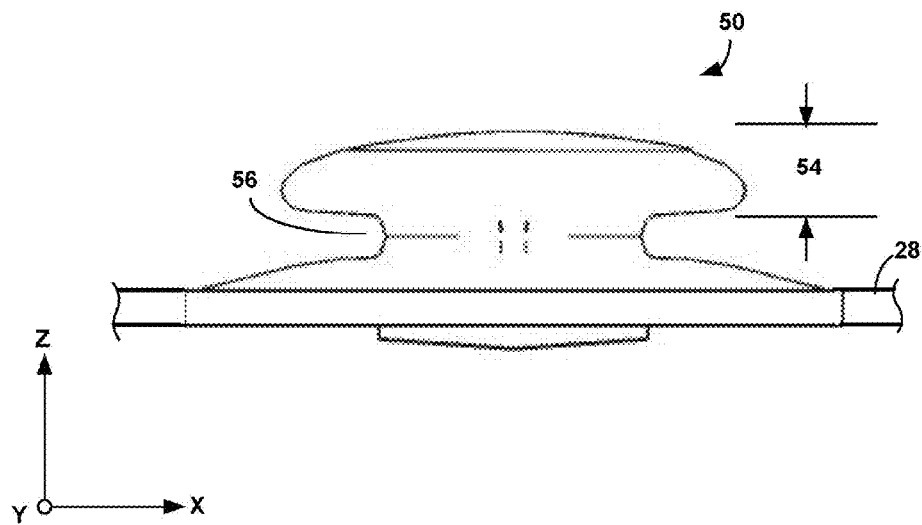
FIGS. 4A-4C are cross-sectional views of different example corresponding male and female coupling hardware, respectively, for connecting the example case of FIG. 1 to the example case accessory of FIG. 3.
Figure 4B:
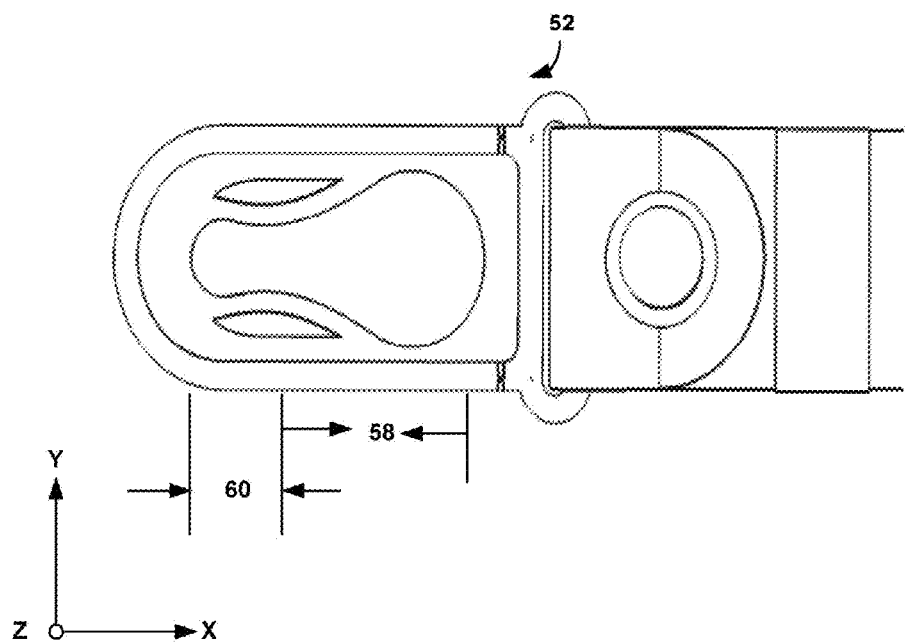
Figure 4C:
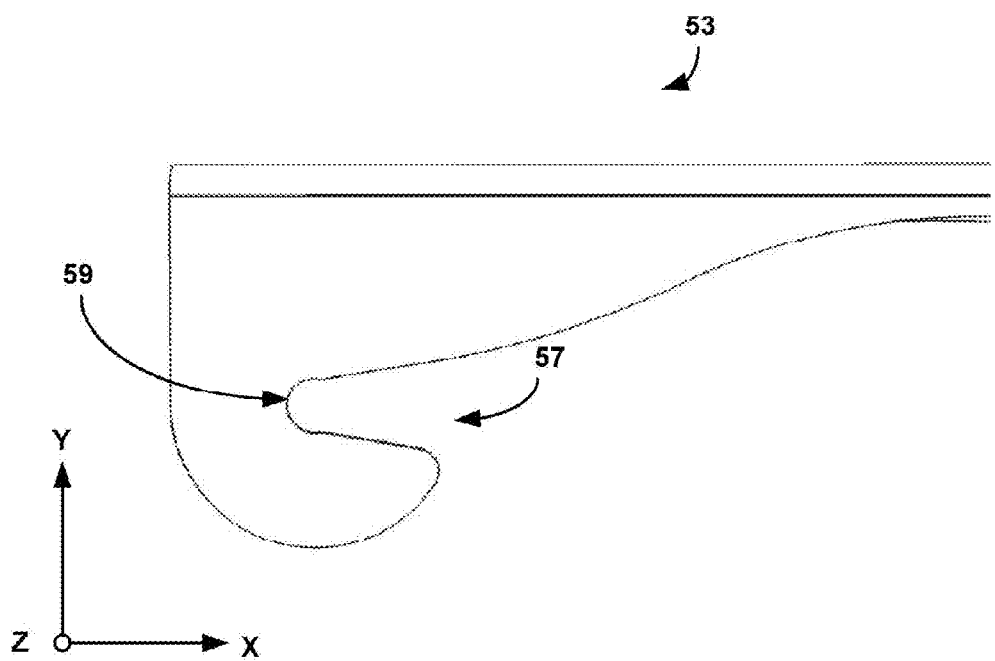

In examples where accessory-attachment nodes 40 includes male coupling hardware and case accessory 42 includes corresponding female coupling hardware, the respective male and female coupling hardware can define any suitable sizes and shapes. FIGS. 4A-4C are conceptual illustrations of different example configurations of corresponding male and female coupling hardware. FIG. 4A is a cross-sectional view of an example male accessory-attachment node 50. FIG. 4B is a cross-sectional view of an example configuration of a corresponding female connector 52. FIG. 4C is a cross-sectional view of another example configuration of a corresponding female connector 53.

In the example of FIG. 4A, male accessory-attachment node 50 extends outwardly from rear surface 28 (i.e., in the Z-direction indicated on FIG. 4A) and includes a head portion 54 and a neck portion 56. Head portion 54 defines a larger cross-sectional area (i.e., in the X-Y plane of FIG. 4A) than neck portion 56. Head portion 54 and/or neck portion 56 of male accessory-attachment node 50 can be inserted corresponding female hardware to couple case 10 to case accessory 42. For example, head portion 54 and/or neck portion 56 of male accessory-attachment node 50 can be inserted into female connector 52 illustrated in FIG. 4B and/or female connector 53 illustrated in FIG. 4C.

In the example of FIG. 4B, female connector 52 defines aperture 58 and slot 60. Aperture 58 is configured (i.e., sized and shaped) to receive head portion 54 of male accessory-attachment node 50. Slot 60 is configured to receive neck portion 56 of male accessory-attachment node 50. Male accessory-attachment node 50 can be coupled to female connector 52 by inserting head portion 54 into aperture 58 (e.g., by pressing head portion 54 in the negative Z-direction indicated on FIG. 4B) and thereafter sliding neck portion 56 into slot 60 (e.g., by moving neck portion 56 in the negative X-direction indicated on FIG. 4B). When male accessory-attachment node 50 and female connector 52 are so engaged, head portion 54 of male accessory-attachment node 50 may prevent neck portion 56 of male accessory-attachment node 50 from inadvertently being removed from slot 60 of female connector 52. Rather, a deliberate two-directional motion (i.e., first in the X-direction indicated on FIG. 4B and then in a positive Z-direction) may be required to disengage male accessory-attachment node 50 from female connector 52.

In the example of FIG. 4C, female connector 53 defines a receiving guide 57 and a mating aperture 59 at the terminal end of receiving guide 57 (i.e., the terminal end in negative X-direction indicated on FIG. 4C). Receiving guide 57 is configured to receive head portion 5 of male accessory-attachment node 50 and guide the head portion into mating aperture 59. Male accessory-attachment node 50 can be coupled to female connector 53 by inserting head portion 54 into receiving guide 57 (e.g., by pressing head portion 54 in the negative Z-direction indicated on FIG. 4C) and thereafter sliding neck portion 56 in the negative X-direction indicated on FIG. 4C until neck portion 56 resides in mating aperture 59. When male accessory-attachment node 50 and female connector 53 are so engaged, head portion 54 of male accessory-attachment node 50 may prevent neck portion 56 of male accessory-attachment node 50 from inadvertently being removed from mating aperture 59 of female connector 53.

Independent of the specific configuration of each accessory-attachment node of accessory-attachment nodes 40 (FIG. 3), case 10 can include any suitable number of accessory-attachment nodes positioned at any suitable location on case 10. Further, the number and/or positioning of accessory-attachment nodes 40 may vary based, e.g., on the size, shape, and/or weight of case 10. In FIG. 3, case 10 includes four accessory-attachment nodes 40 arranged near the four corners of main body 12. Such an arrangement may be useful for a rectangularly-shaped electronic device, where a combination of at least two of the four accessory-attachment nodes 40 can be used to fix the orientation of the electronic device in space. In other examples, however, case 10 can include fewer accessory-attachment nodes 40 (e.g., one, two, or three accessory-attachment nodes) or more accessory-attachment nodes 40 (e.g., five, six, or more accessory-attachment nodes 40). For instance, in one example, case 10 includes a single accessory-attachment node substantially centered on rear surface 28 of main body 12. Depending on the case accessory to which case 10 is coupled to in such an example, case 10 may rotate relative to the case accessory via the single accessory-attachment node.

In different examples, each accessory-attachment node of accessory-attachment nodes 40 may permanently formed with main body 12 or may be removable from main body 12. An accessory-attachment node that is permanently formed with main body 12 may be integrally formed with the structure of main body 12 or otherwise permanently affixed to main body 12. By contrast, an accessory-attachment node that is removable from main body 12 may include one or more features for temporarily connecting the node to main body 12. In one example, main body 12 includes threaded holes and accessory-attachment nodes 40 are configured to be removably screwed and unscrewed into the threaded holes. In such example, components other than accessory-attachment nodes 40 may be configured to be removably screwed and unscrewed into the threaded holes as well. In another example, each accessory-attachment node of accessory-attachment nodes 40 include a detent (such as, e.g., a biased spring mechanism) that is configured to be removably inserted into an aperture defined by main body 12. Removable accessory-attachment nodes may be useful for a variety of reasons including, e.g., to reposition and/or replace a node during the service life of case 10.

Figure 11:
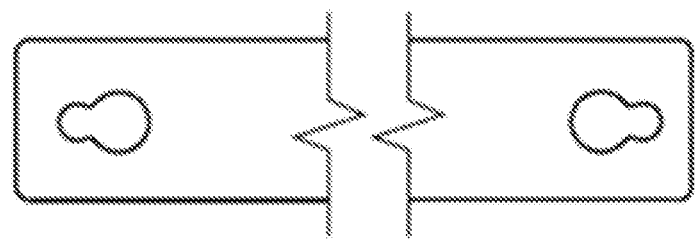
FIG. 11 is a top view of a hand strap case accessory.

In the example of FIG. 3, case 10 is coupled to case accessory 42. Case accessory 42 may include any accessory that supplements or enhances the use, transport, and/or storage of electronic device 16. Example case accessories include, but are not limited to: a stationary wall-mounting frame (e.g., for displaying photographs), a frame with a moveable arm, a stand-up frame, a shoulder strap (e.g., for carrying case 10), a car headrest frame (e.g., a frame that wraps around a car headrest), a car front-seat frame (e.g., a frame that wraps around a car front seat), and a hand strap (see FIG. 11). In some examples, case accessory 42 includes a plurality of different case accessories (only one of which is illustrated in FIG. 3). In such an example, case 10, and in particular electronic device 16 connected to case 10, may be attached and detached from each of the different case accessories, e.g., as case 10 is transported from one location to another location, or as a user switches from using electronic device 16 for one task to using electronic device 16 for another task.

Figure 5:
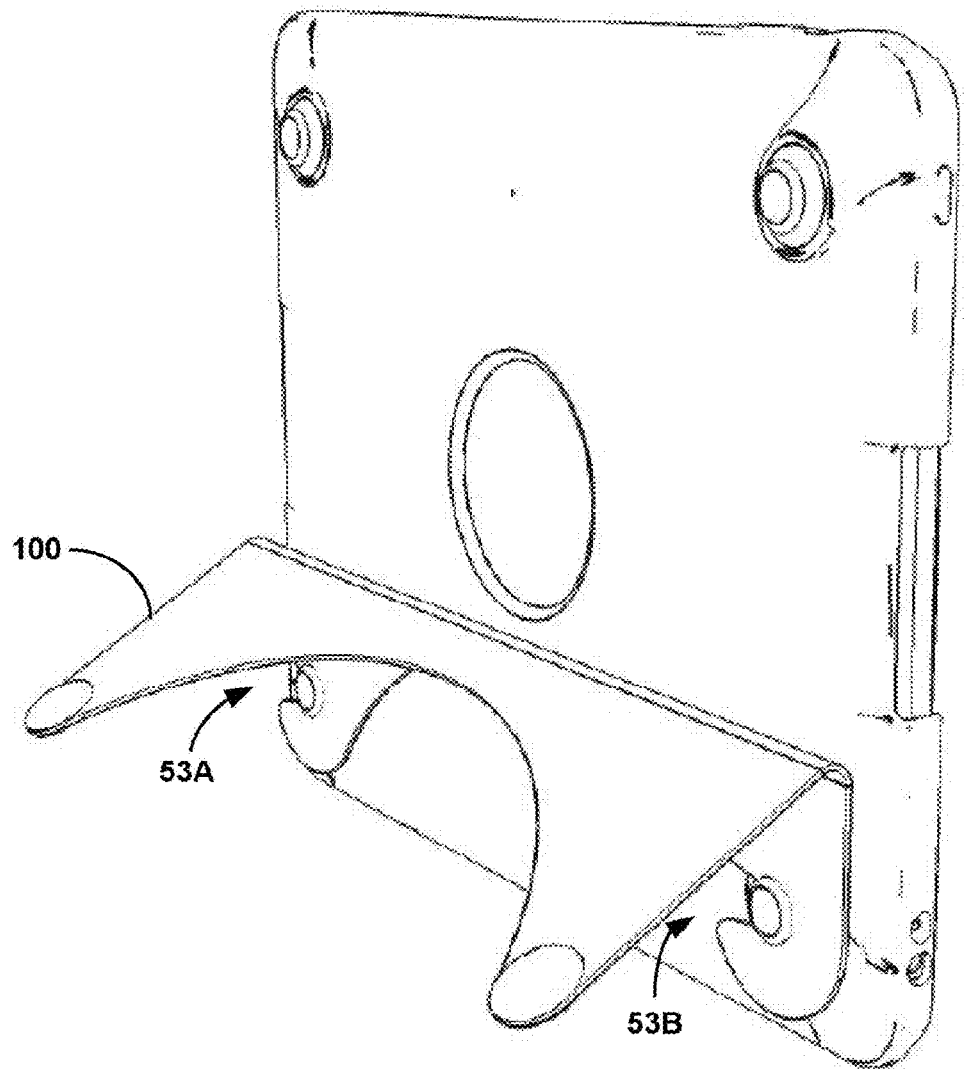
FIG. 5 is a perspective view of an example stand-up frame case accessory coupled to the example case of FIG. 1.
Figure 6:
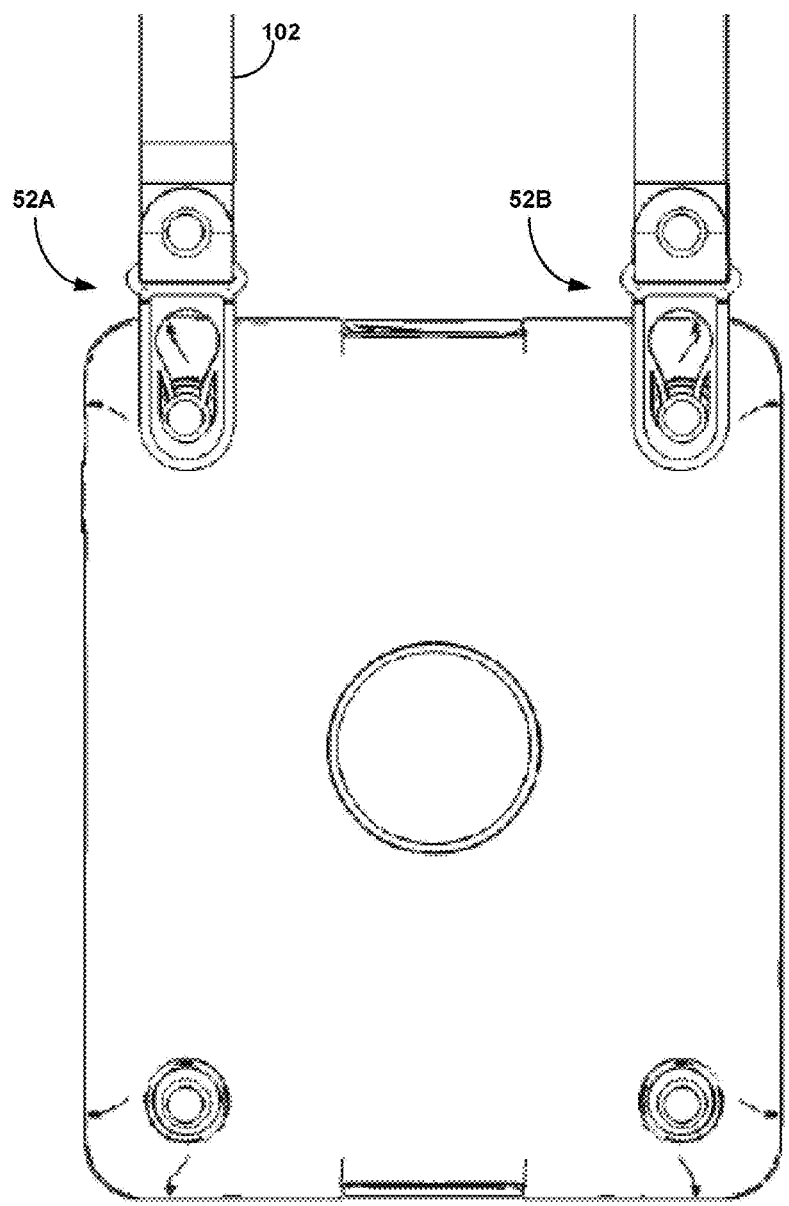
FIG. 6 is a perspective view of an example shoulder strap case accessory coupled to the example case of FIG. 1.

Although case accessory 42 can assume a variety of different shapes and styles, FIGS. 5 and 6 illustrate two example case accessories. FIG. 5 is a conceptual illustration of an example stand-up frame 100 mated to a backside of case 10. Frame 100 includes two female connectors 53A and 53B described above with respect to FIG. 4C. FIG. 6 is a conceptual illustration of an example shoulder strap 102 mated to a backside of case 10. Shoulder strap 102 includes two female connectors 52A and 52 described above with respect to FIG. 4B. Stand-up frame 100 and shoulder strap 102 are non-limiting examples of case accessory 42.

Case 10 may be subject to different physical abuses during the service life of the case. At various times, case 10 may be dropped, scratched, or abraded. Case 10 may protect electronic device 16 from these and other physical abuses. As such, case 10 may be constructed of a robust material able to withstand different physical forces without breaking In various examples, case 10 may be constructed of a metal material (e.g., steel, aluminum, copper), a thermoplastic material (e.g., polystyrene, polyethylene, polypropylene, polyvinyl-based materials), a thermosetting plastic material (e.g., Bakelite, epoxy resin-based materials), or the like. In one example, case 10 is constructed of TPU (thermoplastic polyurethane). Other materials for case 10 are possible.

Independent of the specific materials used to fabricate case 10, case 10 can be constructed from a single material or a plurality of materials. For instance, in one example, main body 12 of case 10 is formed from one material (i.e., main body 12 is integrally formed of the same material) and cover 14 of case 10 is formed of another material. In another example, main body 12 of case 10 is itself fabricated from a plurality of materials. For example, main body 12 of case 10 can include a rigid plate overmolded by a comparatively softer material.

In examples where case 10 includes a rigid plate overmolded by a comparatively softer material, the rigid plate can provide structural support and rigidity to main body 12, e.g., to protect electronic device during use and transport. The comparatively softer material may enhance the tactile feel of case 10. Further, in some example, the comparatively softer material can include embossing (e.g., dimples or texturing) to improve hand grip relative to an unembossed case.

Figure 7:
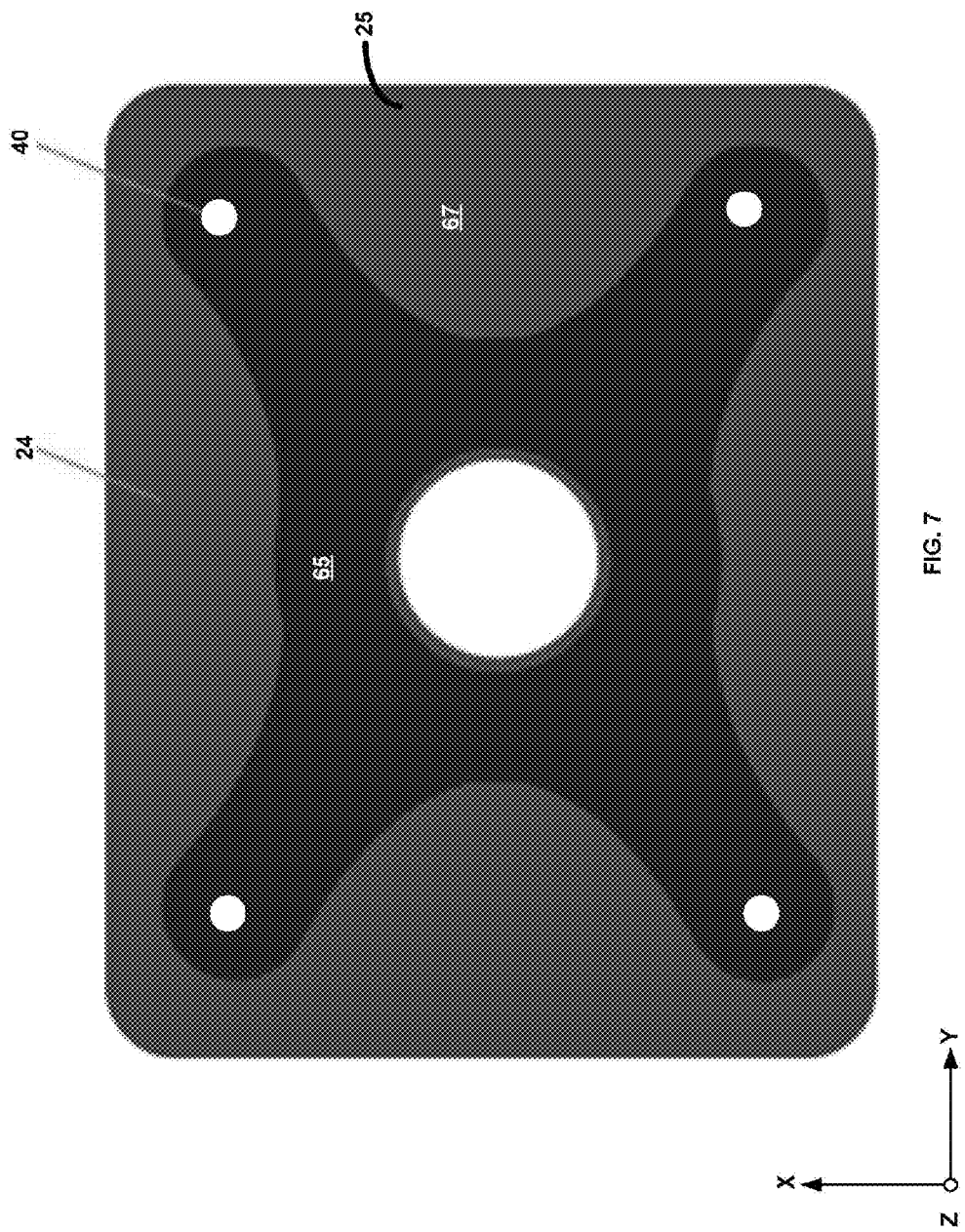
FIG. 7 is a cross-sectional cutaway section of the example case of FIG. 1 that illustrates an example rigid plate overmolded by a comparatively softer material.

FIG. 7 is a cross-sectional cutaway section of main body 12 (FIG. 1) that illustrates an example rigid plate overmolded by a comparatively softer material. Specifically, FIG. 7 is a conceptual illustration of an example of primary section 24 of main body 12 where a portion of front surface 25 has been removed (i.e., in the X-Y plane) to reveal rigid plate 65. Rigid plate 65 is overmolded with comparatively softer material 67.

Figure 8:
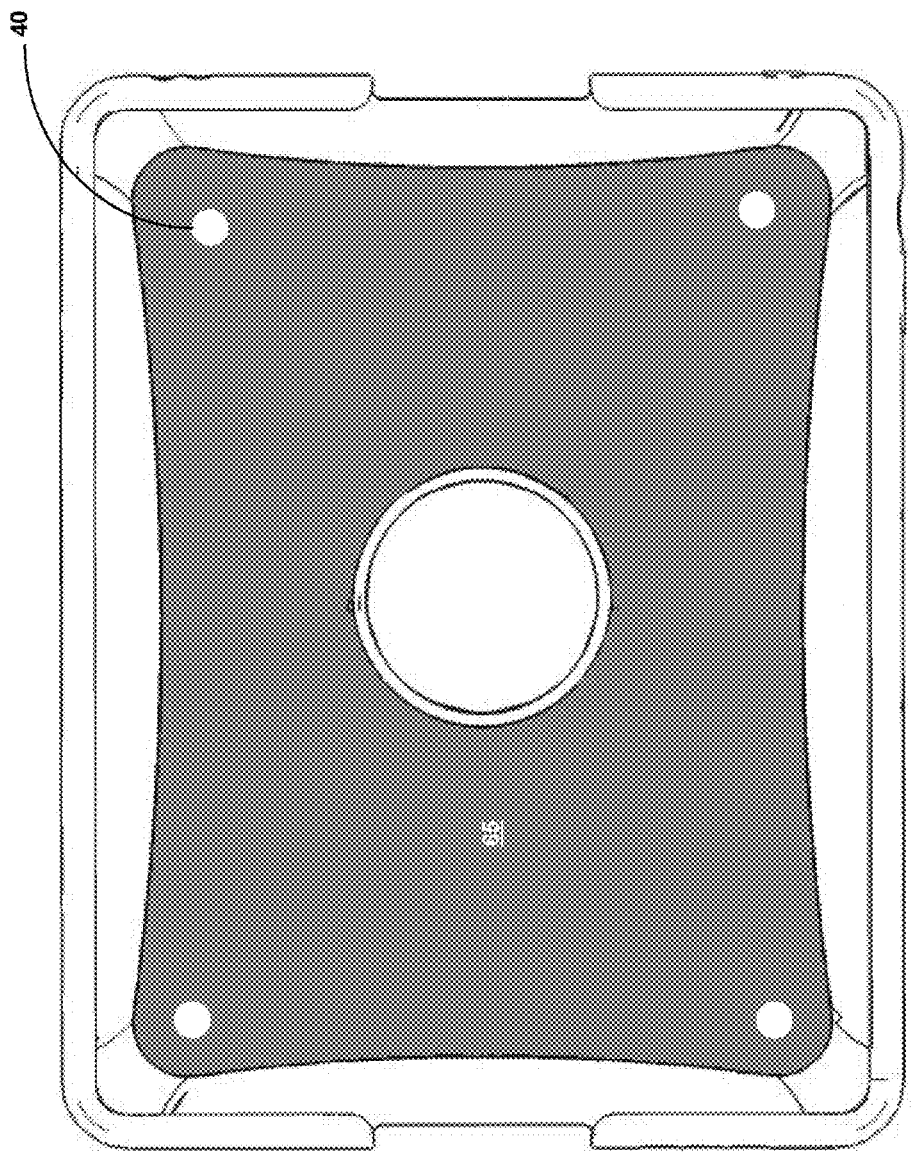
FIG. 8 is another cross-sectional cutaway section of the example case of FIG. 1 that illustrates another example rigid plate overmolded by a comparatively softer material.

Rigid plate 65 may define any suitable size and shape. In the example of FIG. 7, rigid plate 65 defines an X-shape, where accessory-attachment nodes 40 are positioned on opposing prongs of the "X." The size and shape of rigid plate 65 may vary based, e.g., on the number and location of accessory-attachment nodes 40. For example, FIG. 8 illustrates another example rigid plate 65 where the rigid plate defines a substantially rectangular shape with the corners of the rectangle extending to accessory-attachment nodes 40. Accessory-attachment nodes 40 may support the weight of case 10 and electronic device 16 when the case is coupled to case accessory 42. Rigid plate 65 may help reinforce case 10 in the regions adjacent accessory-attachment nodes during such use. For this reason, in some examples, case 10 may include rigid plate 65 at least in the region(s) of primary section 24 which include accessory-attachment nodes 40.

As described above with respect to FIG. 3, each accessory-attachment node of accessory-attachment nodes 40 may permanently formed with main body 12 or may be removable from main body 12. Accordingly, each accessory-attachment node of accessory-attachment nodes 40 may be formed of the same material or materials as main body 12, or each accessory-attachment node of accessory-attachment nodes 40 may be formed of a different material or materials as main body 12. In some examples in which main body 12 includes a substantially rigid plate overmolded by a comparatively softer material, each accessory-attachment node of accessory-attachment nodes 40 is attach to and extends from a rear side of rigid plate 65. In such an arrangement, rigid plate 65 may reinforce the connection between main body 12 and accessory-attachment nodes 40. In some additional examples, each accessory-attachment node of accessory-attachment nodes 40 is uncovered by the comparatively softer material. In these additional examples, the uncovered accessory-attachment nodes 40 may allow the nodes to be accessible to case accessory 42.

Figure 9:
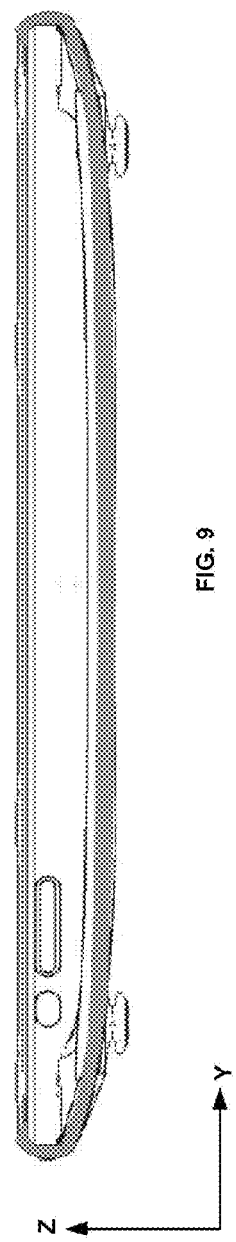
FIG. 9 is a perspective side-view illustration of the example case of FIG. 1.
Figure 10:
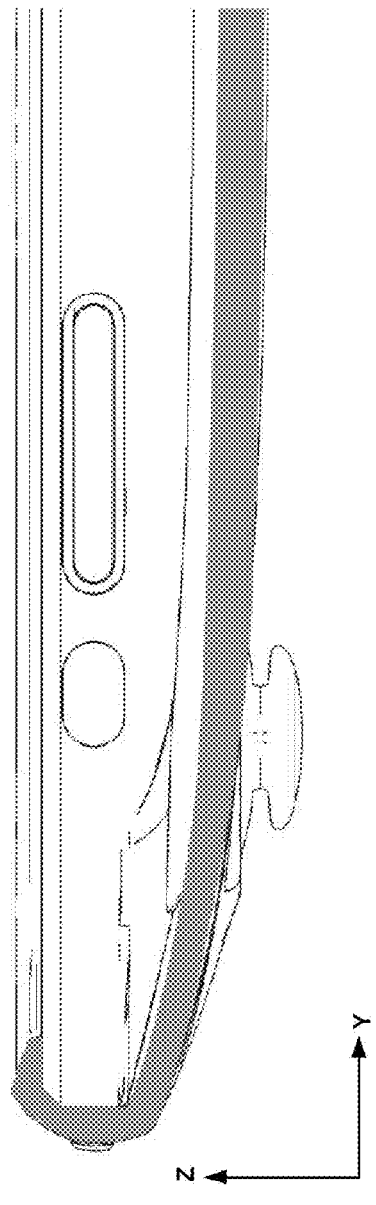
FIG. 10 is an enlarged view of a portion of example case illustrated in FIG. 9.

FIG. 9 is a perspective side-view illustration of case 10 according to some examples of the disclosure. FIG. 10 is an enlarged view of a portion of case 10 illustrated in FIG. 9.

In the foregoing detailed description, the invention has been described with reference to specific examples. However, it may be appreciated that various modifications and changes can be made without departing from the scope of the invention as set forth in the appended claims. Thus, some of the features of preferred embodiments described herein are not necessarily included in preferred embodiments of the invention which are intended for alternative uses.

What is claimed is:

1. A system for protecting an electronic device and using the electronic device in various settings, comprising:
   (a) a first case accessory comprising a hand strap including two or more coupling connectors; and
   (b) a case for the electronic device, the case including
      (i) a main body configured to secure and protect the electronic device, the main body comprising
         (A) a primary section having four corners, a front surface and a rear surface, the front surface of the primary section being configured to contact a back surface of the electronic device,
         (B) first and second side sections each extending frontwardly from the primary section, the first and second side sections being configured to apply force to a first pair of opposed sides of the electronic device, and
         (C) first and second latch sections extending toward one another, the first latch section extending from the first side section, and the second latch section extending from the second side section, the first and second latch sections being configured to apply force to a front of the electronic device; and
      (ii) three or more accessory-attachment nodes arranged near three of the four corners on the rear surface of the primary section, the three or more accessory-attachment nodes comprising a first accessory-attachment node, a second accessory-attachment node, and a third accessory-attachment node, each accessory-attachment node being configured to be coupled to the first case accessory, wherein the main body is selectively positionable to orient the electronic device in three or more orientations relative to the first case accessory by selectively mating two of the coupling connectors with
         (A) the first and second accessory-attachment nodes,
         (B) the second and third accessory-attachment nodes, or
         (C) the first and third accessory-attachment nodes.

2. The system of claim 1, wherein the primary section of the main body includes a substantially rigid plate overmolded by a softer material.

3. The system of claim 2, wherein the three or more accessory-attachment nodes are attached to and extend from a rear side of the substantially rigid plate, with the three or more accessory-attachment nodes being uncovered by the softer material such that the three or more accessory-attachment nodes are accessible to the first case accessory.

4. The system of claim 1, wherein the primary section of the main body includes three or more threaded holes, and the three or more accessory-attachment nodes are removably screwed into the three or more threaded holes.

5. The system of claim 1, wherein the main body is integrally formed of the same material.

6. The system of claim 1, wherein the main body and the three or more accessory-attachment nodes are integrally formed of the same material.

7. The system of claim 1, wherein the three or more accessory-attachment nodes comprise male coupling hardware and the two or more coupling connectors of the first case accessory comprise female coupling hardware.

8. The system of claim 1, wherein the three or more accessory-attachment nodes comprise female coupling hardware and the two or more coupling connectors of the first case accessory comprise male coupling hardware.

9. The system of claim 1, further including a second case accessory, wherein the three or more accessory-attachment nodes are further configured to be coupled to the second case accessory.

10. The system of claim 9, wherein the second case accessory is selected from a group consisting of a stationary wall-mounting frame, a frame with a movable arm, a stand-up frame, a shoulder strap, a car headrest frame, and car front-seat frame.

11. The system of claim 1, wherein the three or more accessory-attachment nodes comprises four accessory-attachment nodes.

12. The system of claim 1, wherein each accessory-attachment node includes a neck portion and a head portion and each coupling connector includes a slot, with the neck portion being configured to mate with the slot and the head portion being configured to inhibit removal of the neck portion from the slot.

13. The system of claim 1, wherein the three or more accessory-attachment nodes are magnetic and are configured to be magnetically coupled to the first case accessory.

14. The system of claim 1, wherein the main body further includes
- (iv) third and fourth side sections each extending frontwardly from the primary section, the third and fourth side sections being configured to apply force to a second pair of opposed sides of the electronic device, and
- (v) third and fourth latch sections extending toward one another, the third latch section extending from the third side section, and the fourth latch section extending from the fourth side section, the third and fourth latch sections being configured to apply force to the front of the electronic device.

15. The system of claim 14, wherein the first, second, third, and fourth side sections of the main body and the first, second, third, and fourth latch sections of the main body all comprise a substantially continuous edge section configured to apply force to the sides and the front of the electronic device.

16. The system of claim 1, wherein
the case's main body further includes (D) an aperture, and
at least one of the case's three or more accessory-attachment nodes include a detent configured to be removably inserted into the aperture.

17. A method of protecting an electronic device and using the electronic device in various settings, the method comprising the steps of:
- (a) providing a case that includes
  - (i) a main body having (A) a primary section with four corners, a front surface and a rear surface, (B) first and second side sections each extending frontwardly from the primary section, and (C) first and second latch sections extending toward one another, the first latch section extending from the first side section, and the second latch section extending from the second side section,
  - (ii) three or more accessory-attachment nodes arranged near three of the four corners on the rear surface along an outer edge of the main body's primary section, the three accessory-attachment nodes comprising a first accessory-attachment node, a second accessory-attachment node, and a third accessory-attachment node;
- (b) putting the electronic device into the case, including
  - (i) positioning a back surface of the electronic device in contact with the front surface of the main body's primary section,
  - (ii) positioning a first pair of opposed sides of the electronic device in contact with the main body's first and second side sections such that the main body's first and second side sections apply force to the first pair of opposed sides of the electronic device, and
  - (iii) positioning a front of the electronic device in contact with the main body's first and second latch sections such that the main body's first and second latch sections apply force to the front of the electronic device;
- (c) providing a first case accessory comprising a hand strap including two or more coupling connectors; and
- (d) coupling the case to the first case accessory, including selectively positioning the main body to orient the electronic device in three or more orientations relative to the first case accessory by selectively mating two of the coupling connectors with
  - (i) the first and second accessory-attachment nodes,
  - (ii) the second and third accessory-attachment nodes, or
  - (iii) the first and third accessory-attachment nodes.

18. The method of claim 17, further comprising:
- (e) providing a second case accessory including two or more coupling connectors;
- (f) decoupling the case from the first case accessory; and
- (g) coupling the case to the second case accessory, including selectively positioning the main body to orient the electronic device in a portrait or landscape orientation relative to the second case accessory by selectively mating two of the accessory-attachment nodes with two of the coupling connectors.

19. The method of claim 18, wherein the second case accessory is selected from a group consisting of a stationary wall-mounting frame, a frame with a movable arm, a stand-up frame, a shoulder strap, a car headrest frame, and car front-seat frame.

20. The method of claim 17, wherein the three or more accessory-attachment nodes comprises four accessory-attachment nodes.

21. The method of claim 20, wherein coupling the case to the first case accessory includes coupling at least two of the four accessory-attachment nodes to the first case accessory.

22. The method of claim 17, wherein each accessory-attachment node includes a neck portion and a head portion and each coupling connector includes a slot, and wherein coupling the case to the first case accessory includes mating the neck portion of at least two of the three or more accessory-attachment nodes to the slots of two of the coupling connectors of the first case accessory.

23. The method of claim 17, wherein the three or more accessory-attachment nodes are magnetic, and wherein coupling the case to the first case accessory includes magnetically coupling at least two of the three or more accessory-attachment nodes to the first case accessory.

24. The method of claim 17, wherein
the case's main body further includes (D) third and fourth side sections each extending frontwardly from the primary section and (E) third and fourth latch sections extending toward one another, the third latch section extending from the third side section, and the fourth latch section extending from the fourth side section, and
putting the electronic device into the case further includes
(iv) positioning a second pair of opposed sides of the electronic device in contact with the main body's third and fourth side sections such that the main body's third and fourth side sections apply force to the second pair of opposed sides and (v) positioning the front of the electronic device in contact with the main body's third and fourth latch sections such that the main body's third and fourth latch sections apply force to the front of the electronic device.

25. The method of claim 24, wherein the first, second, third, and fourth side sections of the main body and the first, second, third, and fourth latch sections of the main body all comprise a substantially continuous edge section.

26. The method of claim 17, wherein the three or more accessory-attachment nodes comprise male coupling hardware, the two or more coupling connectors of the first case accessory comprise female coupling hardware, and coupling the case to the first case accessory includes mating the male coupling hardware with the female coupling hardware of the first case accessory.

27. The method of claim 17, wherein the three or more accessory-attachment nodes comprise female coupling hardware, the two or more coupling connectors of the first case accessory comprise male coupling hardware, and coupling the case to the first case accessory includes mating the female coupling hardware with the male coupling hardware of the first case accessory.

28. The method of claim 17, wherein
the case's main body further includes (D) an aperture,
at least one of the case's three or more accessory-attachment nodes include a detent, and
the method further comprises removably inserting the detent into the aperture to removably attach the at least one accessory-attachment node to the main body.

\* \* \* \* \*